United States Patent

[11] 3,617,713

| [72] | Inventor | Stig Ingvar Karlsson<br>Nyhemsvägen, 2, 371 00 Karlskrona,<br>Sweden |
|---|---|---|
| [21] | Appl. No. | 794,959 |
| [22] | Filed | Jan. 29, 1969 |
| [45] | Patented | Nov. 2, 1971 |
| [32] | Priority | Feb. 27, 1968 |
| [33] | | Sweden |
| [31] | | 2491/68 |

[54] ARRANGEMENT FOR MEASUREMENT OF TEMPERATURE DIFFERENCE AND HEAT VOLUME
4 Claims, 3 Drawing Figs.

[52] U.S. Cl..................................................... 235/92 MT,
235/92 R, 235/92 CV, 235/92 FL, 235/92 PL
[51] Int. Cl............................................................. H03k 21/08
[50] Field of Search........................................... 235/92;
340/347

[56] References Cited
UNITED STATES PATENTS
3,219,803  11/1965  Jones............................. 235/92

Primary Examiner—Maynard R. Wilbur
Assistant Examiner—Robert F. Gnuse
Attorney—Hane & Baxley ABSTRACT: Apparatus for measuring a thermal property such as temperature differences or heat quantity in a flowing fluid includes means for generating a current which is proportional to the temperature difference between two points in the fluid. The current is converted by an analog-to-digital converter to a train of pulses whose repetition rate is proportional to the amplitude of the current. These pulses are accumulated by a counter via a gate which is controlled by a further pulse source such as a pulse-generating volumeter.

INVENTOR
STIG INGVAR KARLSSON

BY Hane and Baxley

ATTORNEYS

ARRANGEMENT FOR MEASUREMENT OF TEMPERATURE DIFFERENCE AND HEAT VOLUME

The invention refers to an arrangement for thermal measurements such as temperature, temperature differences, quantity of heat and heat effect limit. There is a need for an arrangement which can perform such thermal measurements of stationary and flowing media, e.g., water, steam, oil, air and so on and which gives exact results without being expensive to produce. The invention refers to such an arrangement, which in all substantial parts is constructed of electrical components making it less bulky than mechanically constructed meters used up to now. Furthermore, the invention arrangement is more versatile than heretofore known devices since it can be used for several different purposes through minor modifications. The characteristics of the invention appear in the claims enclosed.

Figure 1:
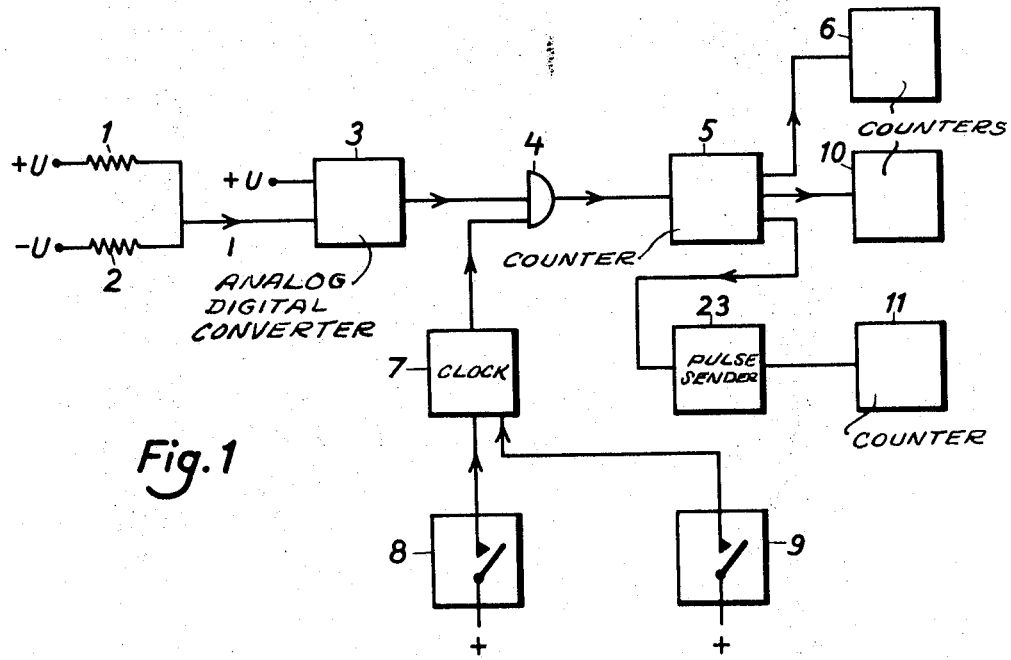
Figure 3:
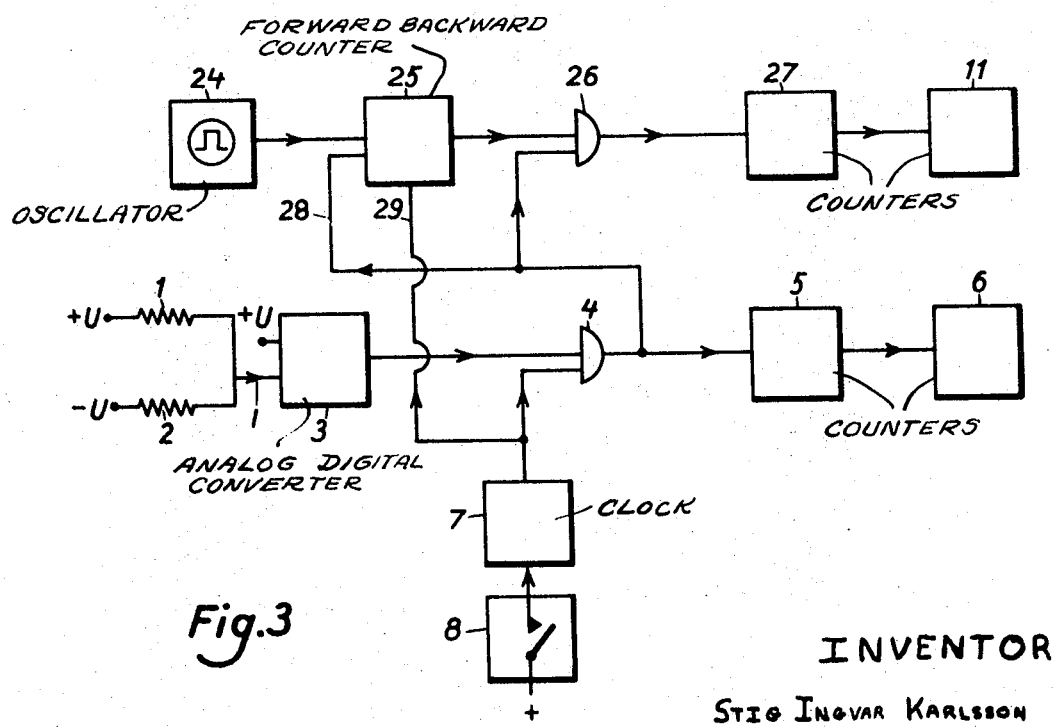
Figure 2:
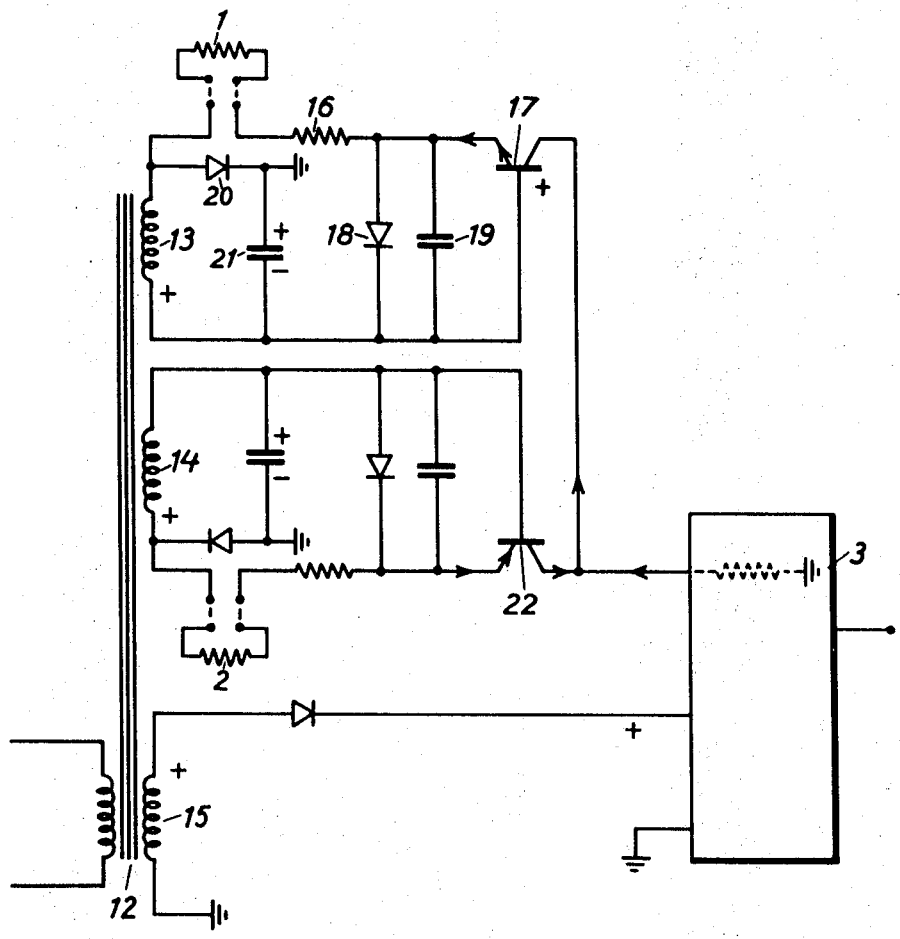

The invention is described below with reference to the drawings. FIG. 1 shows a block diagram of an example of an arrangement in accordance with the invention for measurement of a quantity of heat in a flowing medium. FIG. 2 shows a temperature difference circuit included in the arrangement in accordance with FIG. 1, and FIG. 3 shows an effect limit meter.

The heat quantity meter in FIG. 1 includes a temperature difference circuit, consisting of two temperature-sensitive elements 1 and 2, which in this case consist of resistance thermometers connected to voltages +U and −U and a differential circuit, in which the difference between the currents in the resistance thermometers 1 and 2 are formed. This difference current, which is a measure of the temperature difference, is supplied to an analog digital converter 3, which converts the current difference to pulses with a frequency proportional to the current difference. These pulses are supplied to an electronic counter 5 via a gate 4, which lets the pulse train through, when an opening impulse is received from a clock 7. The clock generates an impulse of 20 ms. length every time it is influenced by an impulse from an impulse contact in a volumeter 8, which closes the impulse contact each time a certain quantity has passed through the meter. The electronic counter 5 sums up the pulses and activates a counter 6 (a usual telephone call-counter), when the number of pulses reaches a certain value.

In a practical embodiment a temperature difference of 0.1° C. between the resistance thermometers 1 and 2 corresponds to one pulse from the analog digital converter. The contact arrangement in the volumeter 8 generates four impulses each cycle. If the volumeter is a usual water meter a revolution corresponds to 100 liters, 1,000 liters or 10,000 liters according to the size of the meter. The electronic counter 5 is dimensioned to transmit an impulse to the counter 6, when it has received 4,000 pulses from the gate 4. This means, that the volumeter has made one turn, i.e. emitted four impulses through the clock 7 to the gate 4, when the temperature difference was 100° C. (corresponding to 1,000 pulses). If the meter is used as a hot water meter and the specific heat of the water = 1 kCal./kg.° C. and the specific weight = 1 kg./dm.³ each unit in the comptometer will be:

10,000 kCal. in the small water meter
100,000 kCal. in the medium-sized water meter
1 GCal. in the largest water meter In FIG. 2 an example is shown of an embodiment of the temperature difference meter with its temperature-sensitive elements 1 and 2 and its differential circuit. From three secondary windings 13, 14 and 15 of a mains-connected transformer 12 three equally large voltages U are extracted. A first and second of these voltages are connected to a temperature-selective element circuit and the third one is connected to the following analog-to-digital converter 3. The two temperature-sensitive element circuits are the same; therefore only the one which includes the element 1 is described. In series with the winding 13 there is connected the temperature-sensitive element 1, a resistor 16 of 400Ω and the base-emitter junction of an NPN-transistor 17. Connected across this gap there is a protective rectifier 18 which is conductive towards the base of the transistor and a capacitor 19 for the short circuiting of high-frequency currents. In parallel with the secondary winding 13 there is connected a series circuit of a rectifier 20 and a capacitor 21. The junction of rectifier 20 and capacitor 21 is connected to ground and thus connected to the corresponding point in the circuit of the temperature-sensitive element 2 and with grounded points in the analog-to-digital converter 3. The transistor 22 in the other temperature-sensitive element circuit is of PNP-type. The collectors of the transistors are directly connected to each other and to the input side of the analog-to-digital converter.

During positive half-periods of the voltage U from the secondary windings 13 and 14 the currents $I_1$ and $I_2$ flow from the emitter electrode in the transistor 17 respectively towards the emitter electrode in the transistor 22:

$$I_1 = U/(R_1+400) \quad \text{and} \quad I_2 = U/(R_2+400)$$

where $R_1$ and $R_2$ are the resistances in the two temperature-sensitive elements 1 and 2. The current $I$ in the conductor leading to the analog-to-digital converter 3 will then be:

$$I = U\left(\frac{1}{R_1+400} - \frac{1}{R_2+400}\right) \quad (1)$$

The temperature-sensitive elements 1, 2 are of resistance thermometers having a nickel winding each with the resistance 100Ω at 0° C. For such windings the following relationship within good precision is obtained:

$$1/(R+400) = 0.002 - t/K \quad (2)$$

where R is the resistance in Ω and $t$ is the temperature in degrees Centigrade.

If $K = 455,170$, then conformity within 1 percent is obtained with the table values within the temperature range −40° C. −+180° C.

From the equations 1 and 2 there is obtained:

$$I = (U/K)(t_2 - t_1)$$

which shows, that the temperature difference is proportional to $I/U$ and since the pulse frequency in the analog-to-digital converter 3 is proportional to $I/U$, the frequency is accordingly proportional to the temperature difference.

Except for the heat quantity measurement the meter can also be used for measurement of temperature difference (or temperature). It is then equipped with one more counter 10, provided with a zero-setting arrangement. Since the pulse frequency coming from the analog-to-digital converter is a measure of the temperature difference (i.e. at a suitable choice of resistance of one of the resistance thermometers a measure of the temperature), one can exclude the gate 4 and in the electronic counter obtain a measure of the temperature, which is registered in the supplementary counter 10. This requires, however, a certain changing over in the electronical counter, which can be justified in an arrangement, where only the temperature is to be measured. In a heat quantity meter the arrangement is provided with an impulse sender 9, which is connected in parallel to the impulse sender of the volumeter 8. If this impulse sender 9 is arranged to generate 4,000 impulses to the gate 4, via the clock 7, each impulse from the electronic counter 5 to the counter 10 corresponds to a temperature difference of 0.1° C. This means, that when the counter 6 for heat units is disconnected, a numerical presentation of the prevailing temperature (the temperature difference) with a degree of accuracy of 0.1° C. is given in the meter 10. Less accurate measurements may be satisfied with a degree of accuracy of 1° C. when 400 impulses are transmitted from the impulse sender 9. Such a measurement of the temperature in a heat quantity meter also gives a measure of the correct function of the meter.

The arrangement according to the invention can be modified to enable the measurement of the consumption above a certain effect limit, which consumption is registered in a counter 11. This can be done in two ways. One way is based on the fact that a certain effect limit can be determined by the time during which a certain number of impulses are counted into an arrangement 23. Arrangement 23 then sends the counted impulses which exceed this number before the time is out to the counter 11. This can be executed with means, known per se, including, e.g., a clock and a relay chain or by means of transistor circuits.

The other way to measure the excess consumption is described with reference to FIG. 3. For each impulse from the volumeter 8 a number of pulses enter the counter 5, which correspond to the energy consumption after the previous measurement impulse. If a long time has passed, many impulses can be permitted without the medium effect having exceeded a certain effect limit, while only a small number of impulses can be permitted, if the time is short. If the time since the previous measurement impulse is denoted by $T$, the effect limit by $P$ and the extracted effect by $E$ the following excess consumption is obtained:

$$E_ö = E - T \cdot P$$

The lower part of FIG. 3 is built up in the same manner as FIG. 1 and the same elements have the same reference numbers. The arrangement, which will show possible excess consumption, is connected after gate 4. It consist of an oscillator 24, having a frequency which is proportional to the effect limit. It is connected to an up-down counter 25, which starts with the value zero after the the previous volumeter pulse. When the following impulse arrives, the counter has been stepped forward to a value proportional to the value $T \cdot P$. The pulses, which after that pass the gate 4, step the counter backwards. When the value zero is obtained, a gate 26 is opened and transmits the remaining pulses to an electronic counter 27, which influences the excess consumption meter 11. The counter 25 is set to zero through the conductor 29.

We claim:

1. Apparatus for measuring a thermal property of a flowing fluid, comprising means for generating first and second electric currents, which are proportional to the temperature at first and second regions of said flowing fluid, differential means for generating the difference circuit of the first and second currents which represents the temperature difference between said two regions, analog-to-digital conversion means for converting said difference current to a first pulse train with a pulse repetition rate proportional to the amplitude of said difference current, clock means for generating a second train of pulses wherein each pulse has a given duration, said clock means including a volumeter whereby the pulse repetition rate of said second train of pulses is proportional to the volume flow rate of the flowing fluid, a gating means having a first input connected to said analog-to-digital conversion means, a second input connected to said clock means, and an output whereby pulses from said analog-to-digital conversion means pass to the output of said gating means only in the presence of pulses from said clock means, and counter means connected to the output of said gating means for accumulating pulses whereby the accumulated pulses represent a measure of the thermal property.

2. The apparatus of claim 1 wherein said counter means has a limited capacity and emits an overflow pulse each time said capacity is reached and thereafter recycles.

3. Apparatus for measuring a thermal property of a flowing fluid, comprising means for generating first and second electric currents, which are proportional to the temperature at first and second regions of said flowing fluid, differential means for generating the difference circuit of the first and second currents which represents the temperature difference between said two regions, analog-to-digital conversion means for converting said difference current to a first pulse train with a pulse repetition rate proportional to the amplitude of said difference current, clock means for generating a second train of pulses wherein each pulse has a given duration, said clock means including a volumeter whereby the pulse repetition rate of said second train of pulses is proportional to the volume flow rate of the flowing fluid, a gating means having a first input connected to said analog-to-digital conversion means, a second input connected to said clock means, and an output whereby pulses from said analog-to-digital conversion means pass to the output of said gating means only in the presence of pulses from said clock means, counter means connected to the output of said gating means for accumulating pulses, said counter means having a limited capacity and emitting an overflow pulse each time said capacity is reached and thereafter recycles, and means connected to said counter means for accumulating a predetermined number of the overflow pulses and thereafter retransmitting the remaining overflow pulses and further counter means for accumulating the retransmitted overflow pulses whereby the pulses accumulated by said further counter means represent the measurement of the thermal property above a certain threshold.

4. Apparatus for measuring a thermal property of a flowing fluid, comprising means for generating first and second electric current, which are proportional to the temperature at first and second regions of said flowing fluid, differential means for generating the difference circuit of the first and second currents which represents the temperature difference between said two regions, analog-to-digital conversion means for converting said difference current to a first pulse train with a pulse repetition rate proportional to the amplitude of said difference current, clock means for generating a second train of pulses wherein each pulse has a given duration, a gating means having a first input connected to said analog-to-digital conversion means, a second input connected to said clock means, and an output whereby pulses from said analog-to-digital conversion means pass to the output of said gating means only in the presence of pulses from said clock means, first counter means connected to the output of said gating means for accumulating pulses, whereby the accumulated pulses represent a measure of the thermal property, a pulse generator for generating pulses having a repetition rate representing a threshold value of the thermal property, an up-down pulse counter means having inputs connected to said pulse generator, the output of said gating means and said clock means for subtracting the sum of the pulses from said gating means from the sum of the pulses from said pulse generator during the period of time between two pulses from said clock means and emits a control signal when the difference reaches zero, a further counter means, a gate circuit having one input for receiving said control signal, a second input connected to the output of said gating means and an output whereby the excess pulses from said gating means after the zero difference is reached are transmitted by said gated circuit to said further counter means.

* * * * *